(12) United States Patent
Watanabe et al.

(10) Patent No.: US 7,292,769 B2
(45) Date of Patent: Nov. 6, 2007

(54) RECORDING AND REPRODUCING APPARATUS AND METHOD

(75) Inventors: Jun Watanabe, Kanagawa (JP); Kei Honda, Kanagawa (JP); Natsuo Ito, Kanagawa (JP); Shigeki Yamamoto, Kanagawa (JP); Kae Nagano, Tokyo (JP); Yukinori Kita, Tokyo (JP); Shinya Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1121 days.

(21) Appl. No.: 09/904,319

(22) Filed: Jul. 12, 2001

(65) Prior Publication Data

US 2002/0031327 A1 Mar. 14, 2002

(30) Foreign Application Priority Data

Jul. 13, 2000 (JP) ............................. 2000-212473

(51) Int. Cl.
H04N 5/76 (2006.01)
H04N 7/00 (2006.01)
H04N 5/00 (2006.01)

(52) U.S. Cl. ........................................ 386/46; 386/125

(58) Field of Classification Search .................. 386/46, 386/125; 348/569, 565, 564; 725/37
See application file for complete search history.

(56) References Cited

U.S. PATENT DOCUMENTS 5,692,213 A * 11/1997 Goldberg et al. ........ 715/500.1

6,204,886 B1 * 3/2001 Yoshimura et al. ......... 348/564

FOREIGN PATENT DOCUMENTS

EP 0 762 756 3/1997
GB 2 254 976 10/1992

* cited by examiner

*Primary Examiner*—Thai Q. Tran
*Assistant Examiner*—Nigar Chowdhury
(74) *Attorney, Agent, or Firm*—Frommer Lawrence & Haug LLP; William S. Frommer; Thomas F. Presson

(57) ABSTRACT

A recording and reproducing apparatus is disclosed which comprises: an input element supplied with video signals; a recording element for recording the video signals input through the input element onto a storage medium; a reproducing element for reproducing the video signals from the storage medium; a processing element for generating display-ready video signals on the basis of video monitor image signals supplied by the input element and/or on the basis of the reproduced video signals furnished by the reproducing element; and a controlling element for selectively activating, by a single operation of a user, any one of a recording monitor image, a dual-screen display image made of a recording monitor image and a playback image, and a playback image alone.

16 Claims, 15 Drawing Sheets

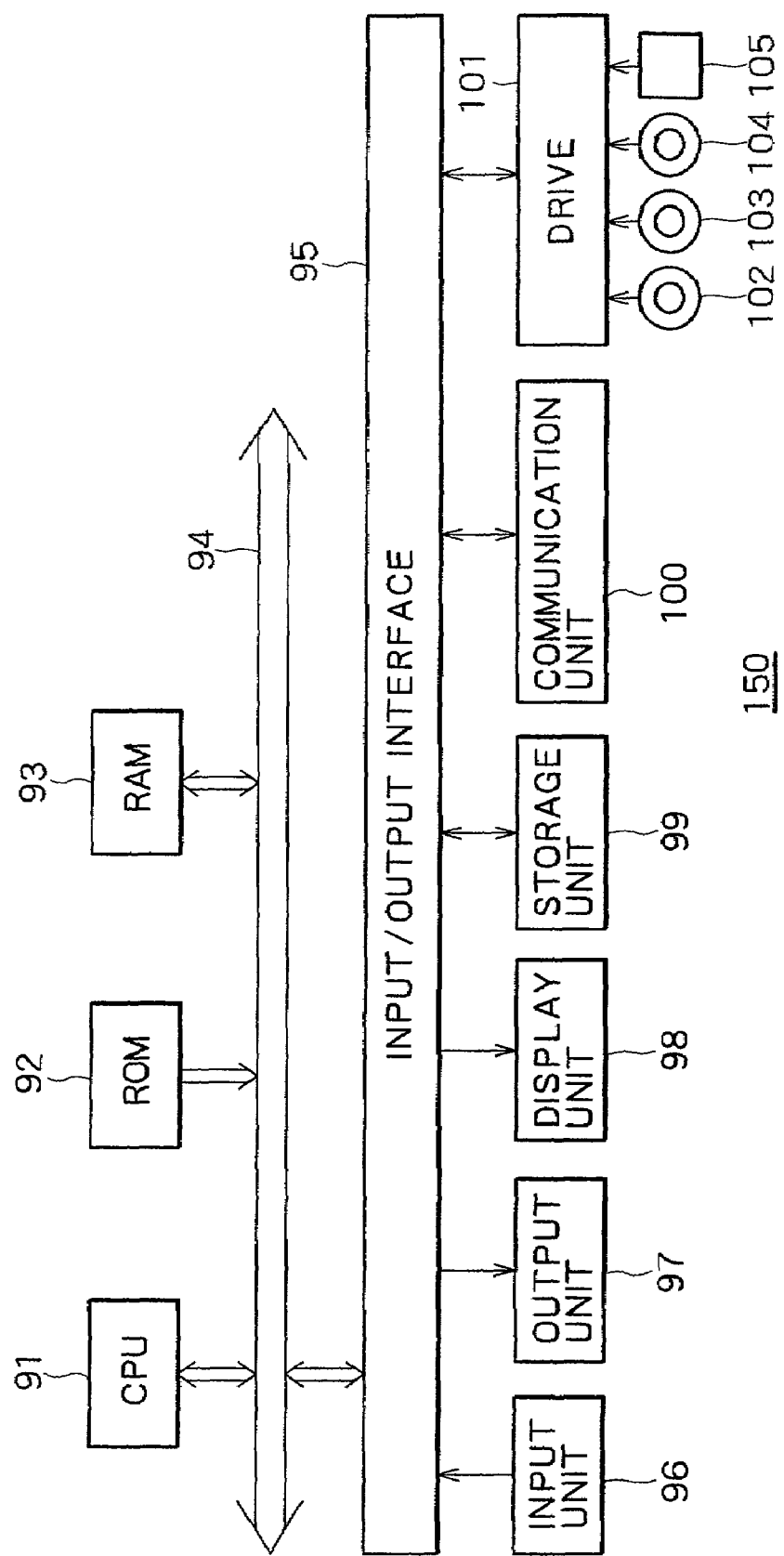

RECORDING AND REPRODUCING APPARATUS AND METHOD

BACKGROUND OF THE INVENTION

The present invention relates to an apparatus and a method for recording and reproducing video signals to and from a storage medium.

In recent years, techniques have been proposed and developed to allow systems designed for rapid data access to record and reproduce data simultaneously to and from a high-speed storage medium such as discs.

Some inconveniences have been experienced during the development. Users tend to be confused when presented with a recording monitor screen and a playback screen displayed merely side by side. Faced with the two screens, the user can lose track of whether the recording monitor screen or the playback screen is currently subject to the ongoing operation. Hence the increased possibility of the user committing errors during operations.

When recording and reproduction are performed simultaneously, one of the two screens can be put on full-screen display. In that case, however, the user is liable to become uncertain about which screen is currently on display.

It is therefore an object of the present invention to overcome the above and other deficiencies of the related art and to provide an apparatus and a method for recording and reproduction whereby a recording monitor screen and a playback screen are clearly indicated as such when on display.

It is another object of the present invention to provide an apparatus and a method for recording and reproduction for implementing an interface designed to eliminate errors of users' operations during simultaneous execution of recording and reproduction.

SUMMARY OF THE INVENTION

In carrying out the invention and according to a first aspect thereof, there is provided a recording and reproducing apparatus comprising: an input element supplied with video signals; a recording element for recording the video signals input through the input element onto a storage medium; a reproducing element for reproducing the video signals from the storage medium; a processing element for generating display-ready video signals on the basis of video monitor image signals supplied by the input element and/or on the basis of the reproduced video signals furnished by the reproducing element; and a controlling element for selectively activating, by a single operation of a user, any one of a recording monitor image, a dual-screen display image made of a recording monitor image and a playback image, and a playback image alone.

In one preferred structure according to the invention, the processing element may generate a display screen indicative of the screen monitor image being selected when the dual-screen display image is currently on display.

According to a second aspect of the invention, there is provided a recording and reproducing apparatus comprising: an input element supplied with video signals; a recording element for recording the video signals input through the input element onto a storage medium; a reproducing element for reproducing the video signals from the storage medium; a processing element for generating display-ready video signals on the basis of video monitor image signals supplied by the input element and/or on the basis of the reproduced video signals furnished by the reproducing element; and a controlling element for making operations of a user effective on one of a recording monitor image and a playback image constituting a dual-screen display.

In another preferred structure according to the invention, the controlling element may cause the processing element to enlarge the currently selected image on display.

According to a third aspect of the invention, there is provided a recording and reproducing apparatus comprising: an input element supplied with video signals; a recording element for recording the video signals input through the input element onto a storage medium; a reproducing element for reproducing the video signals from the storage medium; a processing element for generating display-ready video signals on the basis of video monitor image signals supplied by the input element and/or on the basis of the reproduced video signals furnished by the reproducing element; and a controlling element which, when a follow-up playback is catching up with an on-air recording, then activates a full-screen display of a recording monitor image while giving a sign indicating that the recording monitor image is now activated and on full-screen display.

According to a fourth aspect of the invention, there is provided a recording and reproducing apparatus comprising: an input element supplied with video signals; a recording element for recording the video signals input through the input element onto a storage medium; a reproducing element for reproducing the video signals from the storage medium; a processing element for generating display-ready video signals constituting a recording monitor image and a playback image in a dual-screen display, on the basis of video monitor image signals supplied by the input element as well as on the basis of the reproduced video signals furnished by the reproducing element; and a controlling element for giving a sign indicative of ongoing recording near the recording monitor image, and another sign indicative of ongoing playback near the playback image.

In a further preferred structure according to the invention, when recording is stopped, the sign indicative of ongoing recording may be erased.

In an even further preferred structure according to the invention, when playback is stopped through an operation by a user, the sign indicative of ongoing playback may be replaced by another sign indicative of a pause, with the playback image turned into a still image.

According to a fifth aspect of the invention, there is provided a recording and reproducing method comprising the steps of: recording input video signals onto a storage medium; reproducing the video signals from the storage medium; generating display-ready video signals on the basis of video monitor image signals derived from the input video signals and/or on the basis of the reproduced video signals; and selectively activating, by a single operation of a user, any one of a recording monitor image, a dual-screen display image made of a recording monitor image and a playback image, and a playback image alone.

According to a sixth aspect of the invention, there is provided a recording and reproducing method comprising the steps of: recording input video signals onto a storage medium; reproducing the video signals from the storage medium; generating display-ready video signals on the basis of video monitor image signals derived from the input video signals and/or on the basis of the reproduced video signals; and making operations of a user effective on one of a recording monitor image and a playback image constituting a dual-screen display.

According to a seventh aspect of the invention, there is provided a recording and reproducing method comprising the steps of: recording input video signals onto a storage medium; reproducing the video signals from the storage medium; generating display-ready video signals on the basis of video monitor image signals derived from the input video signals and/or on the basis of the reproduced video signals; and when a follow-up playback is catching up with an on-air recording, then activating a full-screen display of a recording monitor image while giving a sign indicating that the recording monitor image is now activated and on full-screen display.

According to an eighth aspect of the invention, there is provided a recording and reproducing method comprising the steps of: inputting video signal; recording input video signals onto a storage medium; reproducing the video signals from the storage medium; generating display-ready video signals constituting a recording monitor image and a playback image in a dual-screen display, on the basis of video monitor image signals derived from the input video signals as well as on the basis of the reproduced video signals; and giving a sign indicative of ongoing recording near the recording monitor image, and another sign indicative of ongoing playback near the playback image.

As outlined above and through the use of the recording and reproducing apparatus according to the first aspect of the invention and the recording and reproducing method according to the fifth aspect thereof, input video signals are recorded onto a storage medium and reproduced from there. Display-ready video signals are generated on the basis of the reproduced video signals. Any one of a recording monitor image, a dual-screen display image made of a recording monitor image and a playback image, and a playback image alone is selectively activated by a single operation of a user.

As outlined and through the use of the recording and reproducing apparatus according to the second aspect of the invention and the recording and reproducing method according to the sixth aspect thereof, input video signals are recorded onto a storage medium and reproduced from there. Display-ready video signals are generated on the basis of video monitor image signals derived from the input video signals and/or on the basis of the reproduced video signals. Operations of a user are then made effective on one of a recording monitor image and a playback image constituting a dual-screen display.

Through the use of the recording and reproducing apparatus according to the third aspect of the invention and the recording and reproducing method according to the seventh aspect thereof, input video signals are recorded onto a storage medium and reproduced from there. Display-ready video signals are generated on the basis of video monitor image signals derived from the input video signals and/or on the basis of the reproduced video signals. When a follow-up playback is catching up with an on-air recording, a full-screen display of a recording monitor image is activated together with a sign indicating that the recording monitor image is now activated and on full-screen display.

Through the use of the recording and reproducing apparatus according to the fourth aspect of the invention and the recording and reproducing method according to the eighth aspect thereof, input video signals are recorded onto a storage medium and reproduced from there. Display-ready video signals constituting a recording monitor image and a playback image in a dual-screen display are generated on the basis of video monitor image signals derived from the input video signals as well as on the basis of the reproduced video signals. A sign indicative of ongoing recording is given near the recording monitor image, along with another sign indicative of ongoing playback near the playback image.

Other objects, features and advantages of the invention will become more apparent upon a reading of the following description and appended drawings.

BRIEF DESCRIPTION OF THE DRAWINGS

FIG. 15 is a block diagram showing a typical configuration of another video signal recording and reproducing apparatus embodying the invention.

DETAILED DESCRIPTION OF THE PREFERRED EMBODIMENTS

The present invention as embodied in the form of apparatuses and methods for recording and reproducing signals will now be described with reference to the accompanying drawings. First to be described is a recording and reproducing apparatus capable of recording and reproducing video signals to and from a storage medium simultaneously. The storage medium may be any one of the following: optical discs such as DVD-RAMs (writable digital versatile discs), magnetic discs such as hard discs, and semiconductor memories to and from which data may be written and read independently.

Figure 1:
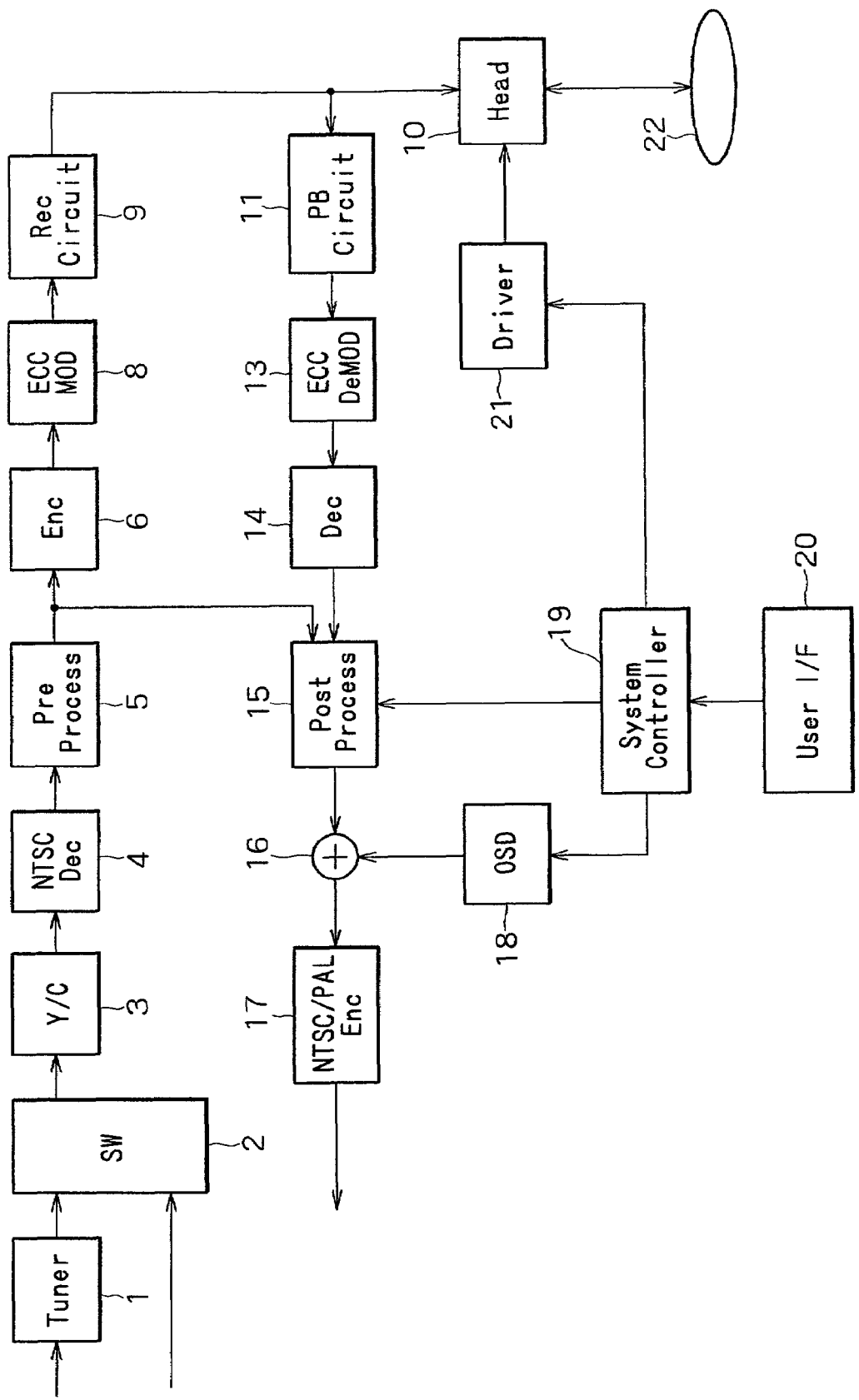
FIG. 1 is a block diagram showing a typical configuration of a video signal recording and reproducing apparatus embodying the invention.

The video signal recording and reproducing apparatus shown in FIG. 1 comprises: a tuner 1 for receiving RF signals input via an antenna; a switch 2 for receiving a composite input from the outside and a composite signal from the tuner 1 and selectively outputting one of the two inputs; a YC separation circuit 3 that subjects the composite signal coming from the switch 2 to YC separation; a NTSC decoder 4 which converts YC signals prior to pre-processing; a pre-processor 5 for effecting various video signal processes such as pre-filtering of luminance and color difference signals supplied by the YC separation circuit 3; an encoder 6 for generating an elementary stream by subjecting video signals coming from the pre-processor 5, e.g. to MPEG compression coding; an ECC modulation circuit 8 which adds an error correcting code to the video signals compression-coded by the encoder 6 and which modulates the compression-coded video signals supplemented with the error correcting code; a recording circuit 9 for converting the signals coming from the ECC modulation circuit 8 into recording signals; and a read/write head 10 that writes and reads signals to and from a storage medium 22 in accordance with the recording signals coming from the recording circuit 9.

As illustrated in FIG. 1, the video signal recording and reproducing apparatus further includes: a playback circuit 11 for generating digital signals through binarization of RF signals reproduced by the read/write head 10; an ECC demodulation circuit 13 which demodulates the digital signals from the playback circuit 11 and which subjects the demodulated digital signals to error correction; a decoder 14 for acquiring video signals by subjecting the digital signals coming from the ECC demodulation circuit 13, e.g. to MPEG decompression decoding; a post-processor 15 which effects a switchover between the decompression-decoded video signals from the decoder 14 and the video signals coming from the pre-processor 5 and which performs various image-related processes such as composition, noise filtering and pixel interpolation; an adder 16 that adds the image signals from the post-processor 15 to characters, icons and menu images supplied by an OSD 18 for composition; and an NTSC/PAL encoder 17 which converts the video signals coming from the adder 16 into YC signals before acquiring an analog composite signal through D/A conversion.

In addition, the video signal recording and reproducing apparatus shown in FIG. 1 has a system controller 19 that causes a driver 21 to control read and write positions of the read/write head 10 in accordance with recording, playback or simultaneous recording and playback mode designated by the user via a user interface 20. The system controller 19 causes the post-processor 15 to switch display status in keeping with various display modes such as dual-screen mode, playback screen mode, and recording monitor screen mode designated by the user through the user interface 20. Furthermore, the system controller 19 causes the OSD 18 to retrieve from a memory, not shown, icons and messages for identifying the currently selected display mode and to feed what is retrieved to the adder 16.

Described below with reference to FIGS. 2 through 7 is how the system controller 19 causes the post-processor 15 to switch images on a display screen in keeping with the user's operation.

The system controller 19 starts recording either when detecting a recording instruction given by the user through the user interface or when judging that a predetermined time is reached.

Figure 2:
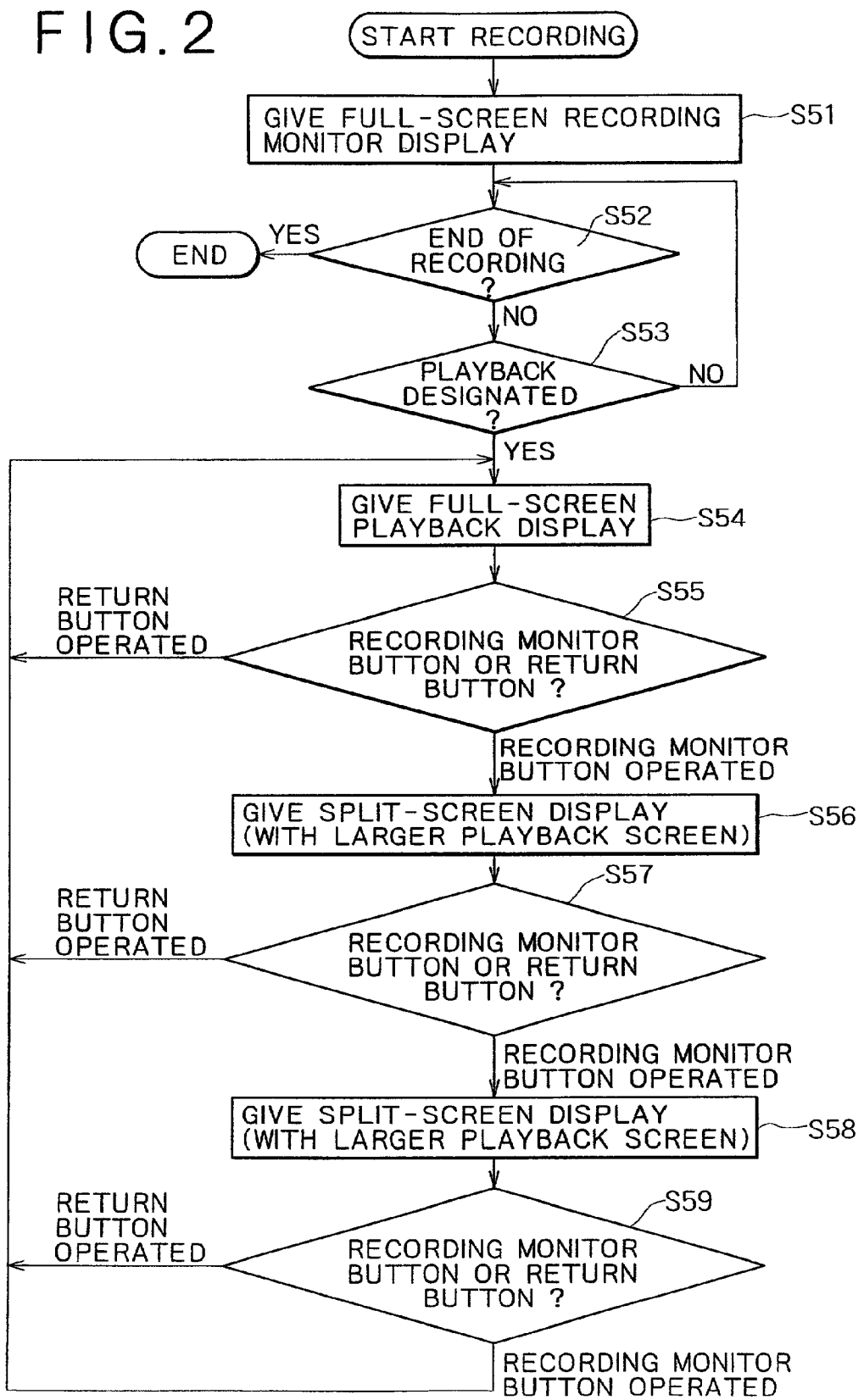
FIG. 2 is a flowchart of steps in which the apparatus of FIG. 2 operates in recording.
Figure 3:
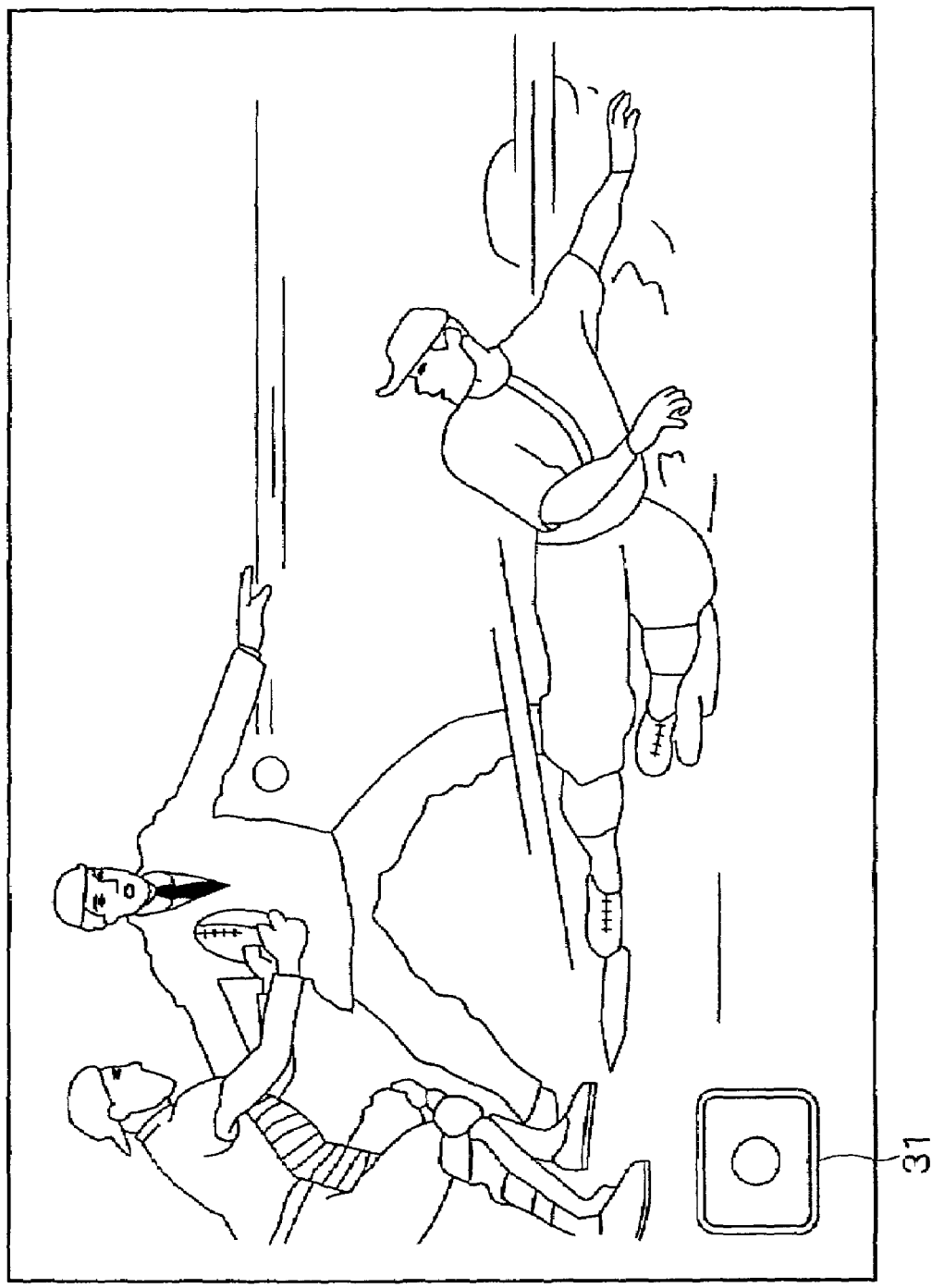
FIG. 3 is a schematic view of a typical display derived from video signals.

In step 51 of FIG. 2, the system controller 19 causes the post-processor 15 to give a full-screen display of a recording monitor image derived from video signals coming from the pre-processor 5, as shown in FIG. 3. At the same time, the system controller 19 causes the OSD 18 to display in the bottom right corner of the screen an icon 31 indicating that the screen now on display is a monitor screen of the video signals being recorded. The icon 31 is made to disappear automatically upon elapse of a predetermined time period from the start of recording. Alternatively, the icon 31 may be arranged to remain where it is until a specific operation is performed by the user or until a display mode switchover is effected.

In step 52, the system controller 19 checks to see if an end of recording is designated through the user interface or if a predetermined recording end time is reached. If the end of recording is judged designated, the system controller 19 terminates recording and enters standby mode. Otherwise the system controller 19 goes to step 53 and checks to see if playback is designated via the user interface.

Figure 4:
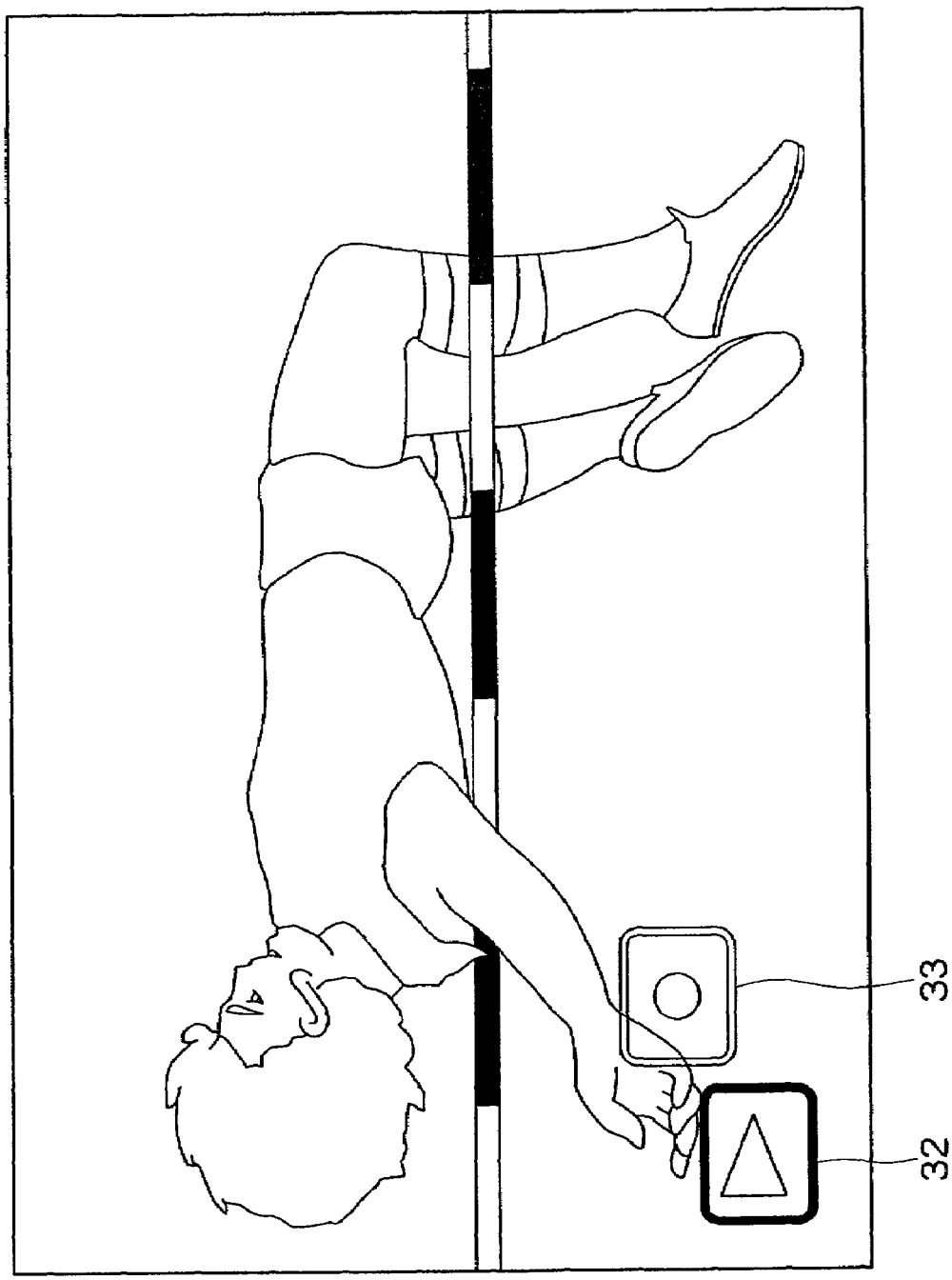
FIG. 4 is a schematic view of another typical display derived from video signals.

If it is judged in step 53 that the user has designated playback of either a previously recorded program or the program being currently recorded, the system controller 19 starts reproducing the program in question. Since recording is still underway, recording and playback will be performed simultaneously. Step 53 is followed by step 54 in which the system controller 19 causes the post-processor 15 to give a full-screen display of a playback image as shown in FIG. 4. At the same time, the system controller 19 causes the OSD 18 to display two icons 32 and 33 side by side in the bottom right corner of the screen. The icon 32 symbolically indicates ongoing playback and the icon 33 is indicative of recording currently underway as well.

The term "follow-up playback" refers to a mode of playback in which the currently recorded program is concurrently reproduced before its termination from the beginning or from any position preceding the on-air recording position of the program. If the speed of playback is higher than that of recording, the playback position follows up and eventually overtakes the recording position. If the playback speed is the same as the recording speed, the distance between the playback position and the recording position remains unchanged and recording ends earlier than playback.

In follow-up playback mode, the system controller 19 causes the driver 21 to alternate the head 10 between the recording position and the playback position. The head 10 is designed to record and reproduce data at a transfer rate sufficiently higher than the bit rate of video signals. When a predetermined quantity of recording data is accumulated in a buffer, not shown, the data are written collectively to the storage medium while previously reproduced and accumulated data in the buffer are being read out in small increments. When the previously reproduced data in the buffer are being exhausted, the system controller 19 causes the driver 21 to shift the head 10 to the playback position to replenish the buffer with newly reproduced data while coded input data to be recorded are being accumulated in the buffer. These processes are repeated so as to perform recording and reproduction simultaneously.

Figure 5:
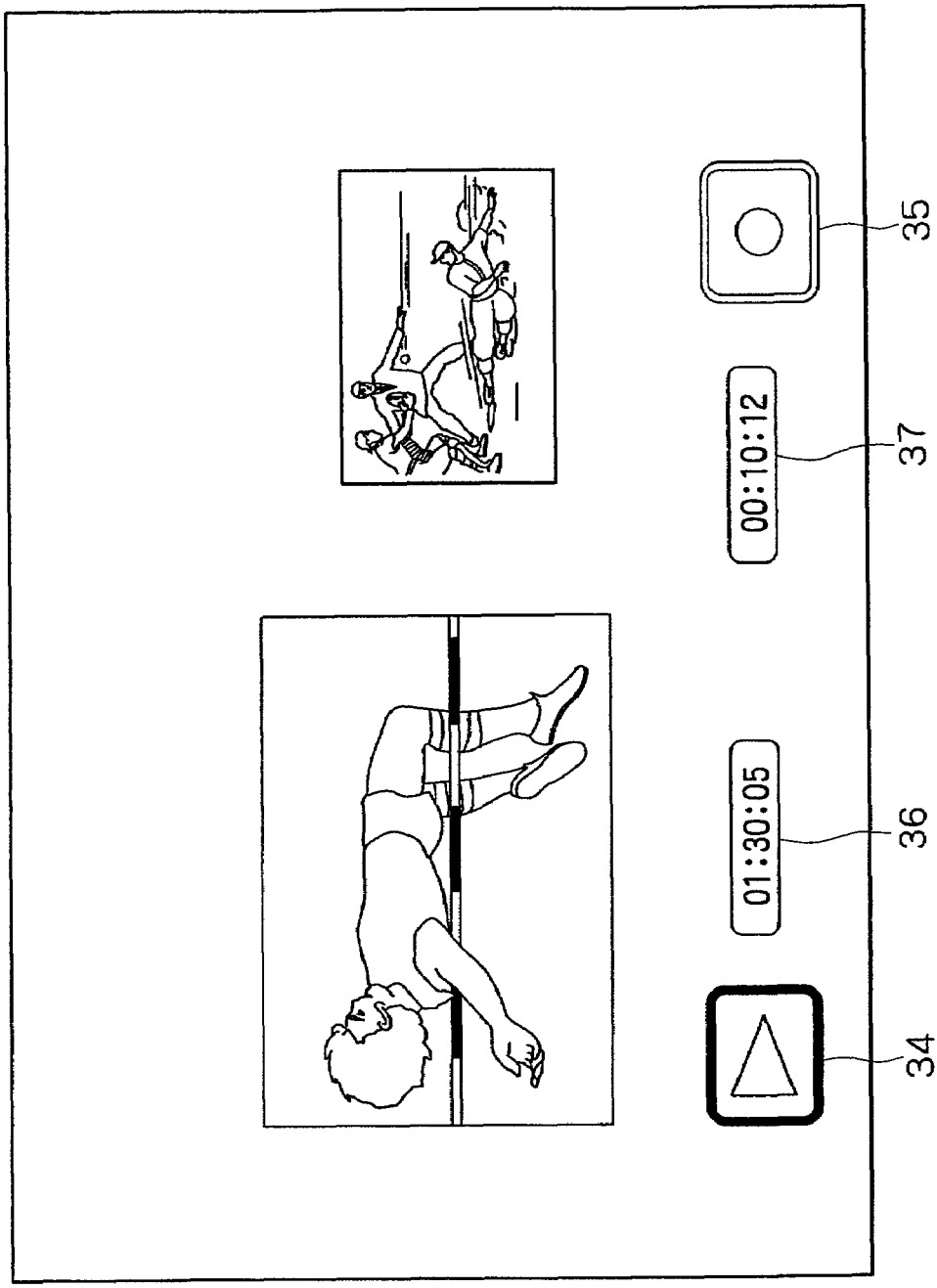
FIG. 5 is a schematic view of another typical display derived from video signals.

In step 55, the system controller 19 judges whether a recording monitor button or a return button is operated via the user interface. If the recording monitor button is judged operated, step 56 is reached. In step 56, the system controller 19 causes the post-processor 15 to give a split-screen display composed of a recording monitor screen and a playback screen as shown in FIG. 5. At this point, the playback screen is made to appear slightly larger than the recording monitor screen. Alternatively, the playback screen being selected may be highlighted in the regions of its frame.

In dual-screen split display mode, the system controller 19 causes the OSD 18 to display two icons 34 and 35 which, located near the playback screen and the recording monitor screen respectively, identify the screens as such. Also given are two time indications 36 and 37, the first showing the current time of the playback position and the second indicating the current time of the recording position.

Figure 6:
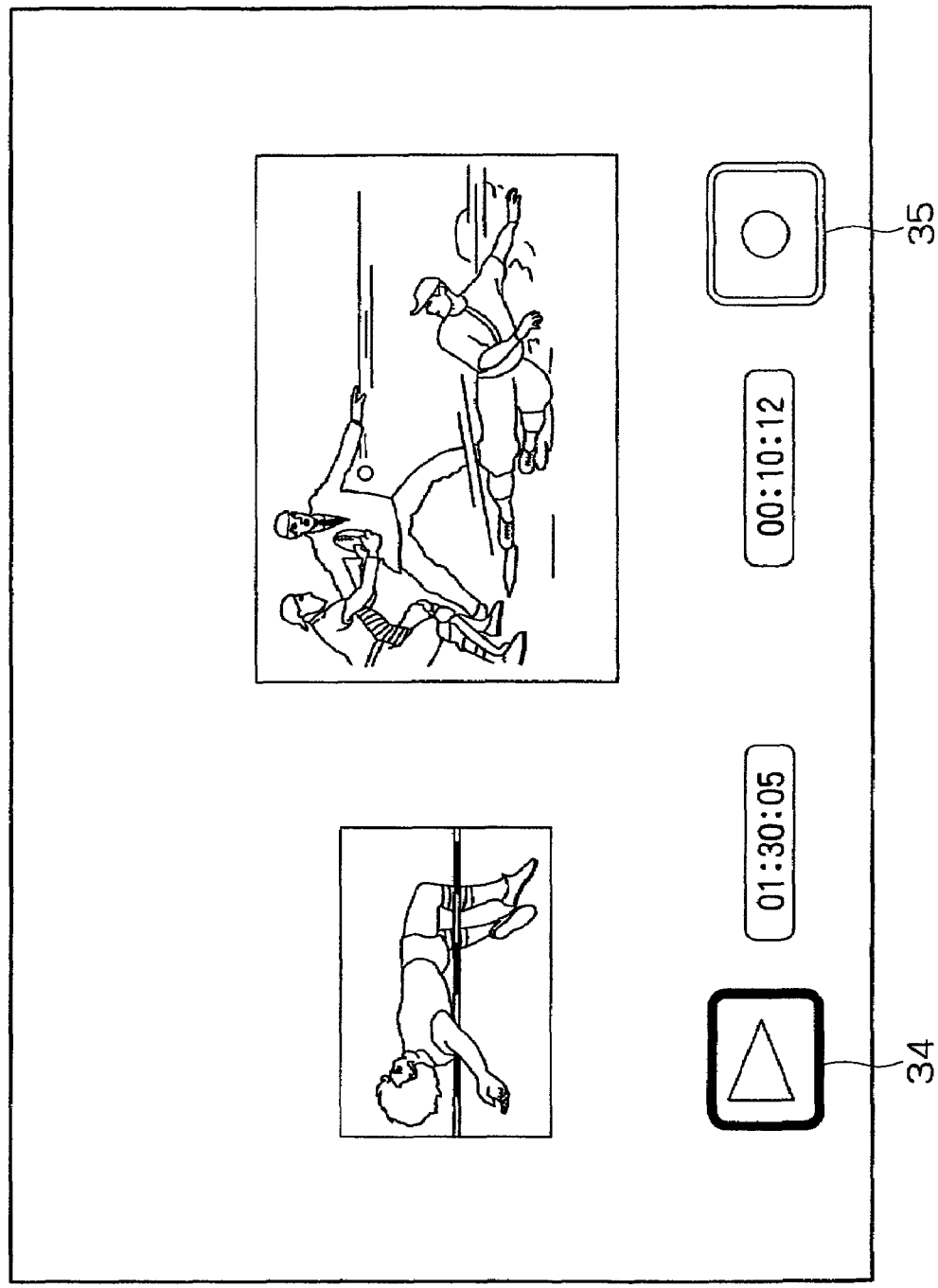
FIG. 6 is a schematic view of another typical display derived from video signals.

In step 57, the system controller 19 judges whether the recording monitor button or the return button is operated via the user interface. If the recording monitor button is judged operated, step 58 is reached. In step 58, the system controller 19 causes the post-processor 15 to give a split-screen display composed of a recording monitor screen and a playback screen as shown in FIG. 6. At this point, the playback screen is made to appear slightly larger than the recording monitor screen. Alternatively, the recording monitor screen being selected may be highlighted in the regions of its frame.

When the recording monitor screen is enlarged, the system controller 19 permits operations by the user only on the recording monitor screen. That is, recording may be stopped or brought to a pause while playback is kept from being affected by any such operations as stop, pause, slow, or high-speed playback at variable speeds. On the other hand, when the playback screen is enlarged, the system controller 19 allows operations by the user only on the playback screen. In this state, playback is subject to any such operations as stop, pause, slow, or high-speed playback at variable speeds while recording cannot be brought to a stop or to a pause.

In step 59, the system controller 19 judges whether the recording monitor button or the return button is operated via the user interface. If the recording monitor button or the return button is judged operated, step 54 is reached again, and the system controller 19 causes the post-processor 15 to give a full-screen display of the playback screen shown in FIG. 4.

The above-described split-screen display made up of an enlarged recording monitor screen and a smaller playback screen, split-screen display constituted by a smaller recording monitor screen and an enlarged playback screen, and playback screen only, may be activated by turns in a unidirectionally cyclical manner by operation of a single recording monitor button furnished on a remote controller.

Operating the return button in step 55, 57 or 59 brings back the full-screen playback display immediately from any display status.

Figure 9:
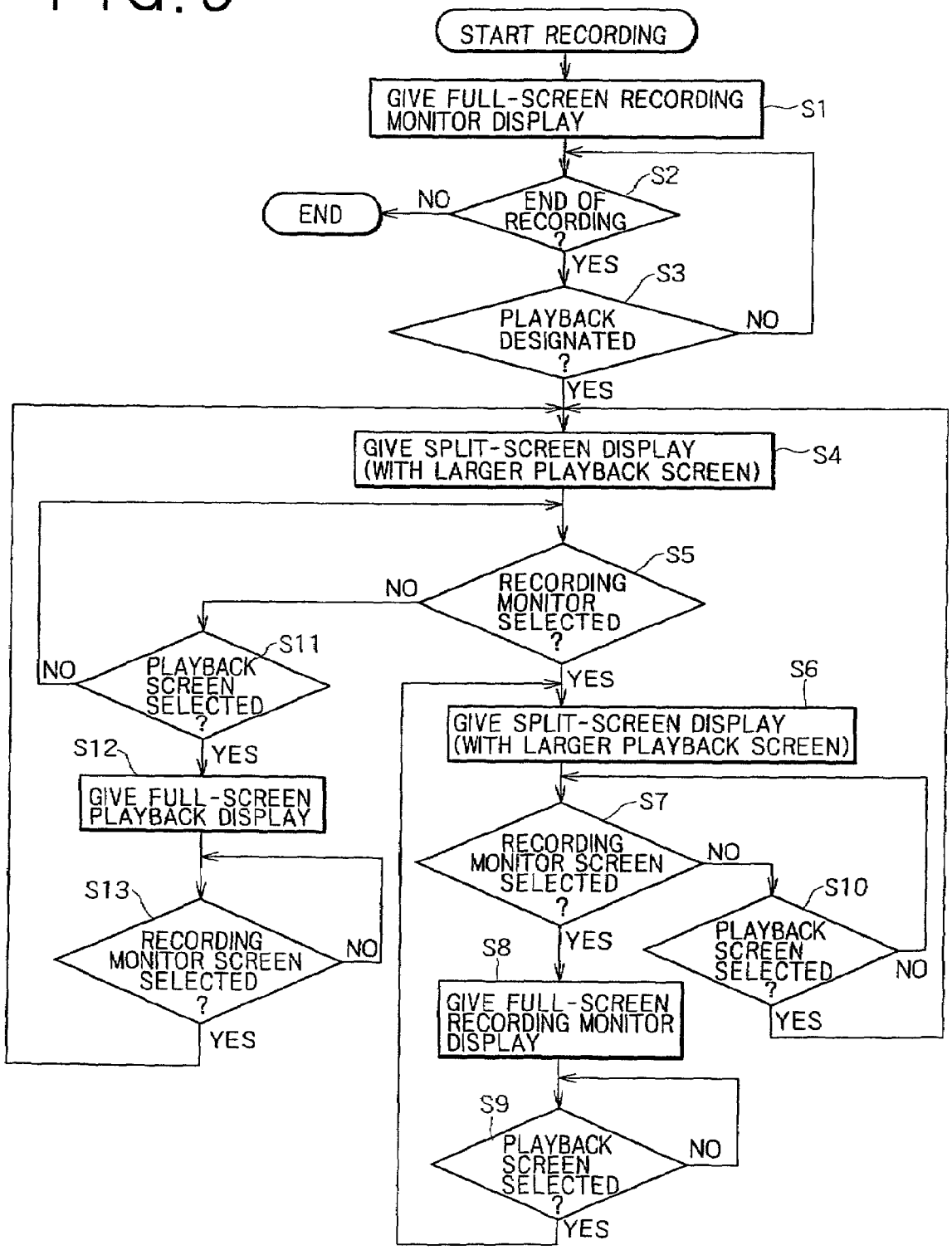
FIG. 9 is a flowchart of steps in which the apparatus of FIG. 1 operates in recording.

Described below with reference to FIG. 9 is a a variation of how the system controller 19 causes the post-processor 15 to switch images on the display screen, not shown.

The system controller 19 starts recording either when detecting a recording instruction given by the user through the user interface or when judging that a predetermined time is reached.

In step 1 of FIG. 9, the system controller 19 causes the post-processor 15 to give a full-screen display of a recording monitor image derived from video signals coming from the pre-processor 5, as shown in FIG. 3. At the same time, the system controller 19 causes the OSD 18 to display in the bottom right corner of the screen the icon 31 indicating that the screen now on display is a monitor screen of the video signals being recorded. The icon 31 is made to disappear automatically upon elapse of a predetermined time period from the start of recording. Alternatively, the icon 31 may be arranged to remain where it is until a specific operation is performed by the user or until a display mode switchover is effected.

In step 2, the system controller 19 checks to see if an end of recording is designated through the user interface or if a predetermined recording end time is reached. If the end of recording is judged designated, the system controller 19 goes to step 3 and checks to see if playback is designated via the user interface. Otherwise the system controller 19 terminates recording and enters standby mode.

If it is judged in step 3 that the user has designated follow-up playback, the system controller 19 goes to step 4 and causes the post-processor 15 to give a split-screen display composed of a recording monitor screen and a playback screen as shown in FIG. 5. At this point, the playback screen is made to appear slightly larger than the recording monitor screen.

With the dual-screen split display in effect, the system controller 19 causes the OSD 18 to display two icons 32 and 33 symbolically indicating the playback screen and the recording monitor screen respectively.

When the playback screen is enlarged, the system controller 19 allows operations by the user only on the playback screen. In this state, playback is subject to any such operations as stop, pause, slow, or high-speed playback at variable speeds while recording cannot be brought to a stop or to a pause.

In step 5, the system controller 19 judges whether the recording monitor screen is selected via the user interface. If the recording monitor screen is judged selected, the system controller 19 goes to step 6 and causes the post-processor 15 to make the playback screen larger than the recording monitor screen, as illustrated in FIG. 6.

When the recording monitor screen is enlarged, the system controller 19 permits operations by the user only on the recording monitor screen. In this state, recording may be stopped or brought to a pause while playback is kept from being affected by any such operations as stop, pause, or playback at variable speeds.

In step 7, the system controller 19 judges whether the recording monitor screen is selected via the user interface. If the recording monitor screen is judged selected, the system controller 19 goes to step 8 and causes the post-processor 15 to give a full-screen recording monitor display as shown in FIG. 3. If the recording monitor screen is not judged selected, the system controller 19 goes to step 10 and judges whether the playback screen is selected via the user interface.

When a dual-screen split display is replaced by a full-screen recording monitor display or playback display, the system controller 19 causes the OSD 18 to display an icon for a predetermined period of time in the bottom right corner of the screen, the icon informing the user of the currently effective display screen mode. More specifically, if the dual-screen split display is replaced by a full-screen recording monitor display, the system controller 19 causes the OSD 18 to display two icons side by side for a predetermined time period in the bottom right corner of the screen, one icon indicating ongoing playback and the other being highlighted to represent the recording monitor screen. If the dual-screen split display is replaced by a full-screen playback display, the system controller 19 causes the OSD 18 also to display two icons side by side for a predetermined time period in the bottom right corner of the screen, one icon being highlighted to indicate ongoing playback and the other representing the recording monitor screen.

If it is judged in step 10 that the playback screen is selected via the user interface, the system controller 19 returns to step 4. In step 4, the system controller 19 causes the post-processor 15 to give a split-screen display composed of a recording monitor screen and a playback screen as shown in FIG. 5, the playback screen being made slightly larger than the recording monitor screen.

In step 9, a check is made to see if the playback screen is selected via the user interface. If the playback screen is judged selected, step 6 is reached again. In step 6, the system controller 19 causes the post-processor 15 to make the recording monitor screen slightly larger than the playback screen on a split-screen display, as illustrated in FIG. 6.

If the recording monitor screen is not selected in step 5, step 11 is reached. In step 11, the system controller 19 checks to see if the playback screen is selected via the user interface. If the playback screen is judged selected, the system controller 19 goes to step 12 and causes the post-processor 15 to give a full-screen playback display as shown in FIG. 4. At the same time, the system controller 19 causes the OSD 18 to display a highlighted icon 32 indicating that the playback screen is now in effect. If the playback screen is not selected in step 11, step 5 is reached again.

In step 13, the system controller 19 checks to see if the recording monitor screen is selected via the user interface. If the recording monitor screen is judged selected in step 13, step 4 is reached again. In step 4, the system controller 19 causes the post-processor 15 to give a split-screen display composed of a recording monitor screen and a playback screen, the playback screen being made slightly larger than the recording monitor screen.

Figure 7:
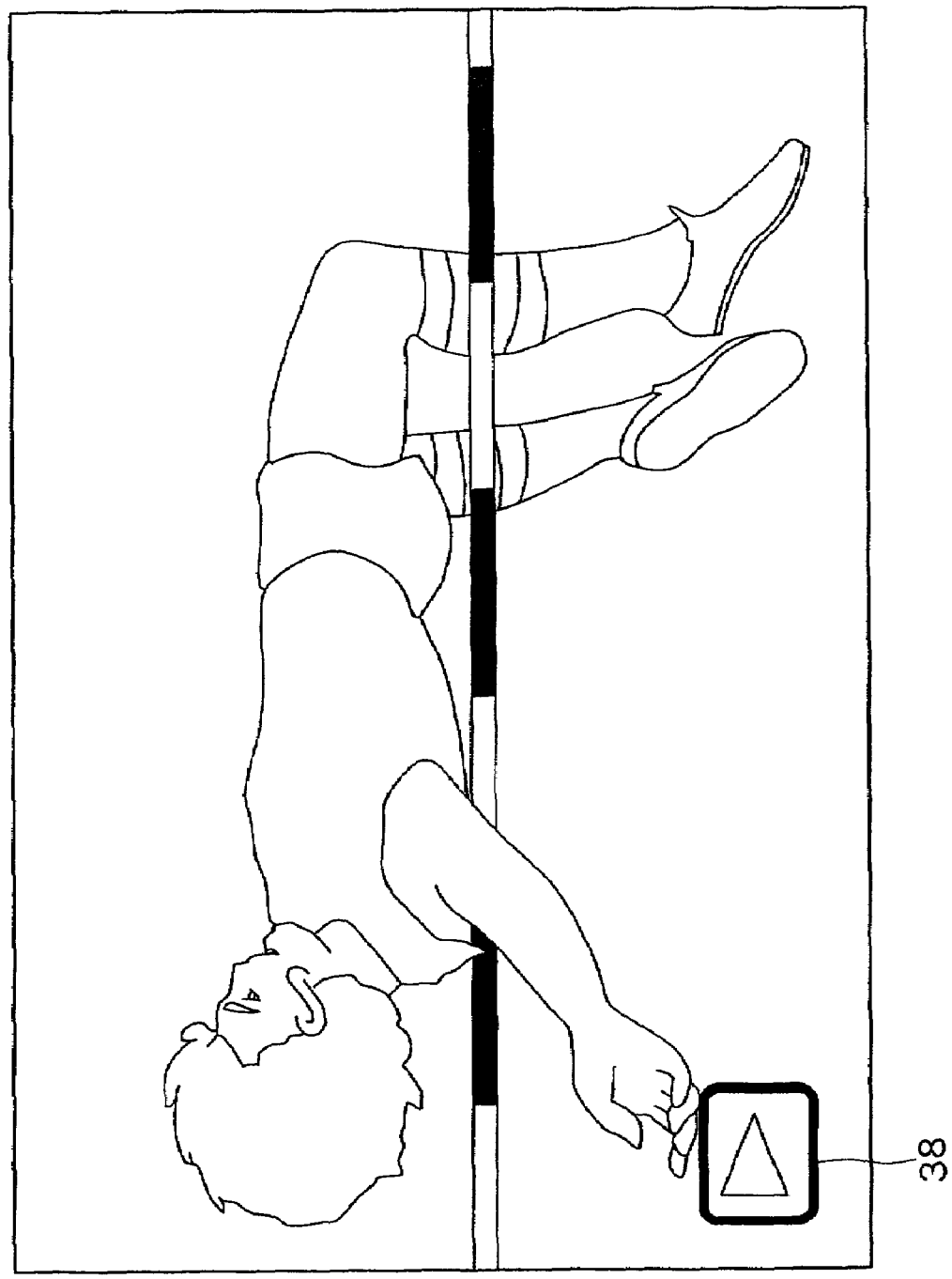
FIG. 7 is a schematic view of another typical display derived from video signals.

The above-described full-screen recording monitor screen, split-screen display made up of an enlarged recording monitor screen and a smaller playback screen, split-screen display constituted by a smaller recording monitor screen and an enlarged playback screen, and playback screen only, may be activated by turns in a bidirectionally cyclical manner by operation of direction pointing buttons furnished on the remote controller. Alternatively, an operation button for calling up the recording monitor screen may be paired with an operation button for invoking the playback display on the remote controller. Whereas the processes in effect when playback was designated during recording were described above, if a previously recorded program is simply being reproduced, a full-screen playback display appears as shown in FIG. 7. In such a case, the system controller 19 causes the OSD 18 to display in the bottom left corner of the screen an icon indicating that playback is undeway.

If recording is designated in that state, step 58 in FIG. 2 or step 6 in FIG. 9 is reached, and the subsequent steps are repeated.

Described below with reference to FIG. 8 as well as to FIGS. 10 through 14 is how the system controller 19 causes the post-processor 15 automatically to switch images on the display screen, not shown, with recording and playback carried out simultaneously.

Figure 8:
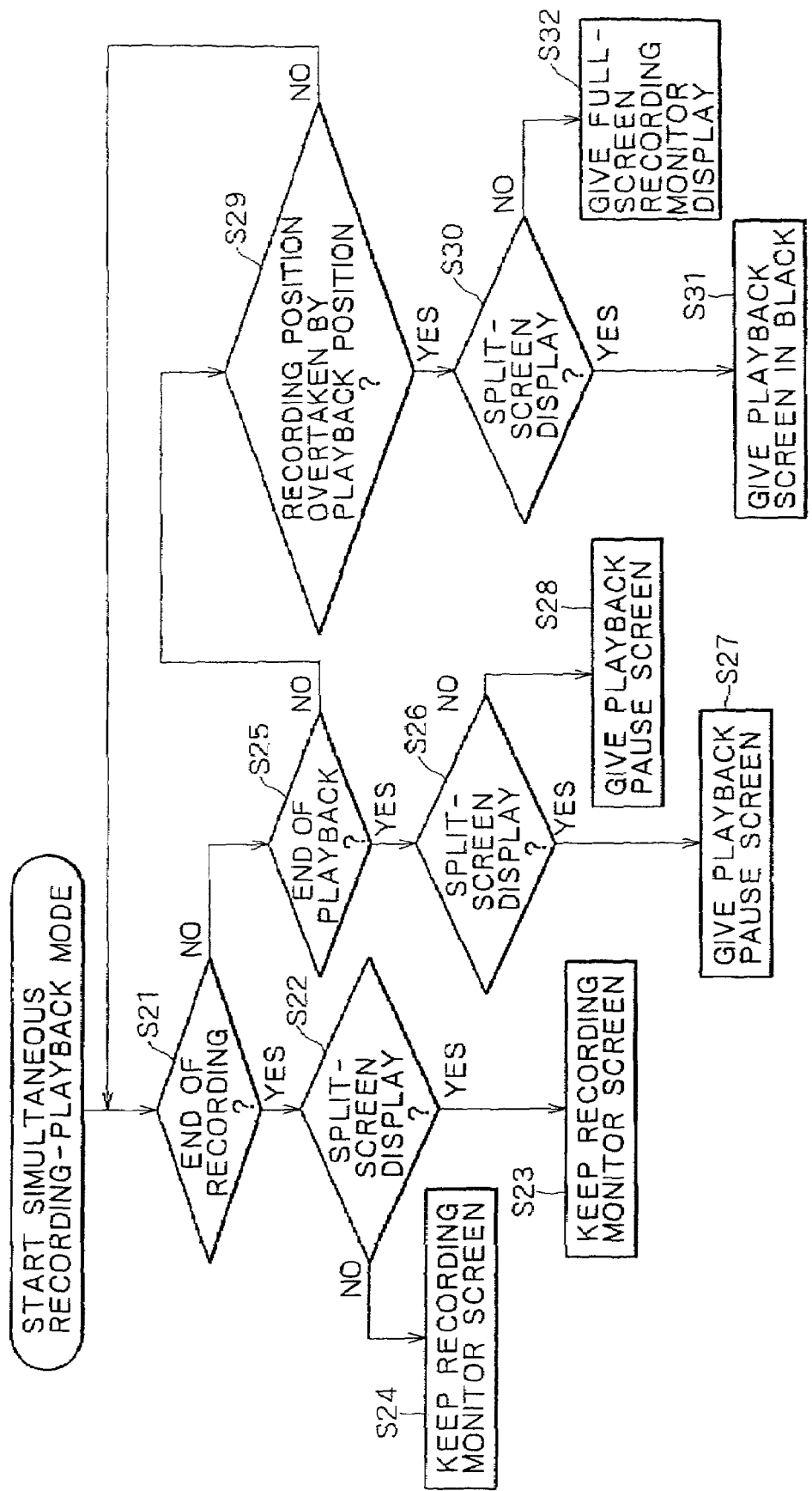
FIG. 8 is flowchart of steps in which the apparatus of FIG. 1 operates in simultaneous recording and reproduction.

If recording and playback are performed concurrently (e.g., in follow-up playback mode) and if a full-screen playback display is underway, then step 21 of FIG. 8 is reached. In step 21, the system controller 19 judges whether recording is stopped by operation of the user or terminated when a predetrermined recording end time is reached.

Figure 10:
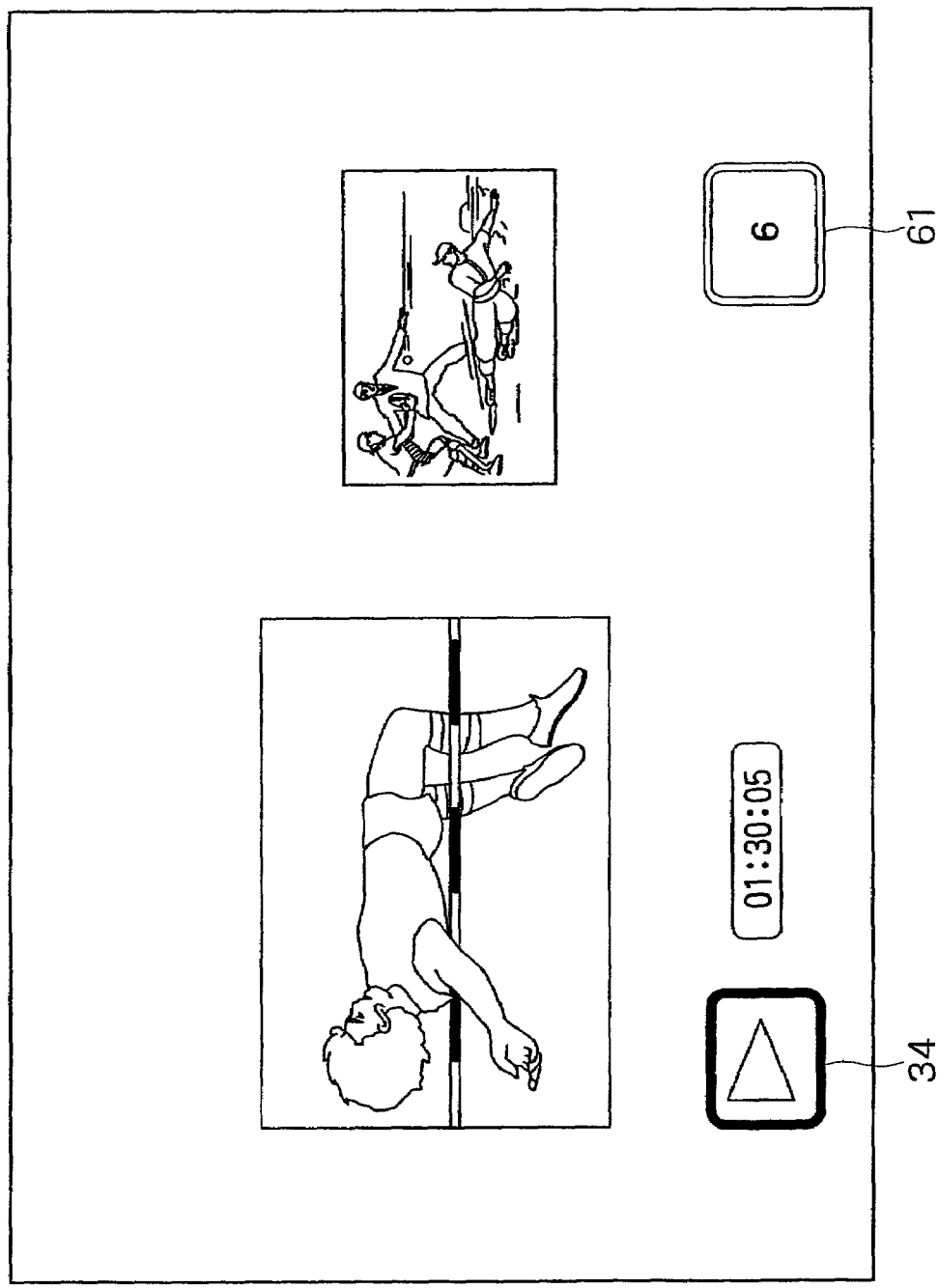
FIG. 10 is a schematic view of another typical display derived from video signals.
Figure 14:
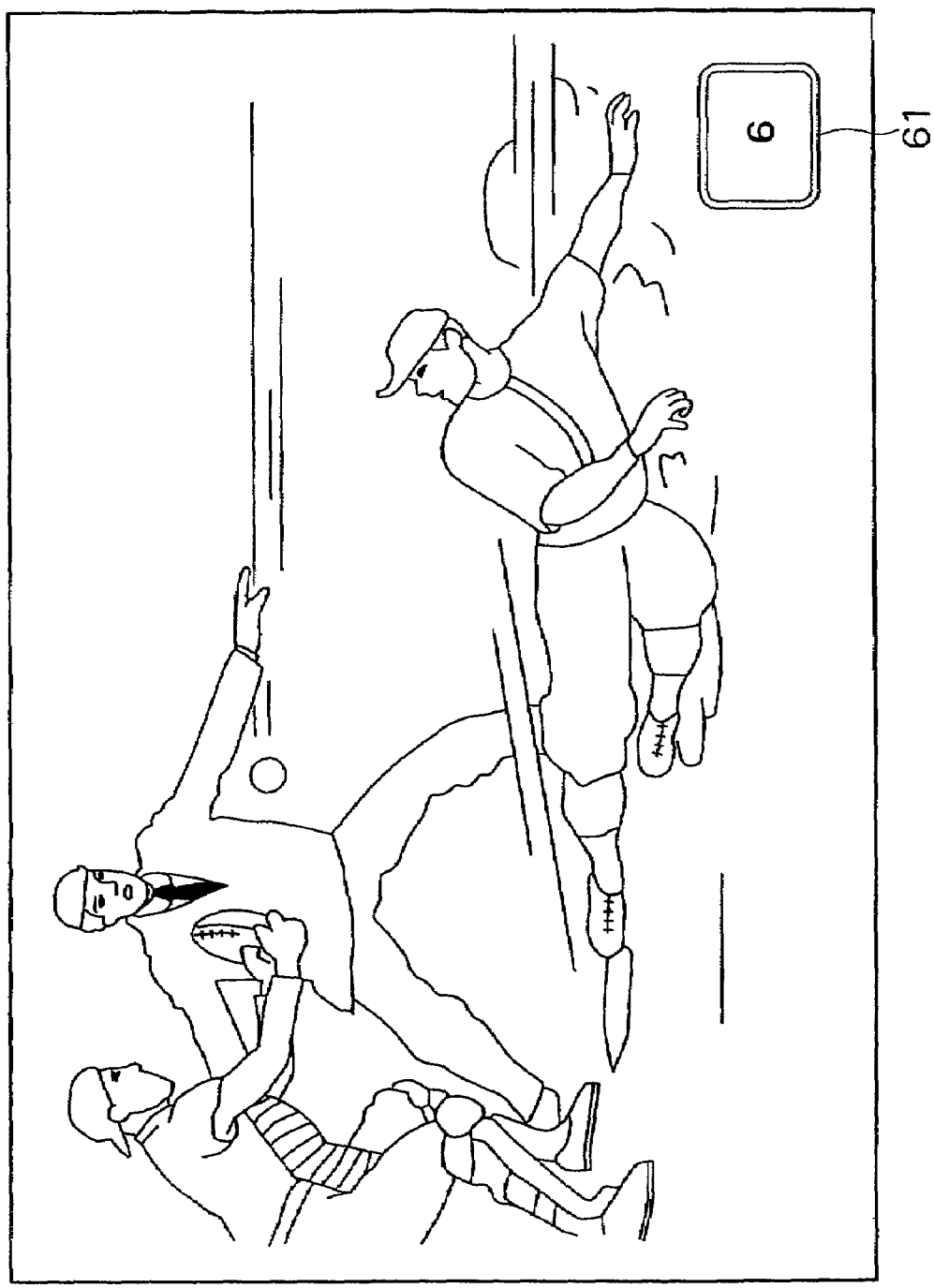
FIG. 14 is a schematic view of another typical display derived from video signals.

When recording is judged terminated, step 22 is reached. In step 22, a check is made to see if a split-screen display composed of a recording monitor screen and a playback screen is selected. If the split-screen display is judged selected, step 23 is reached. In step 23, the system controller causes the post-processor 15 to leave the recording monitor screen as supplied by the pre-processor 5 (i.e., the same as TV screen) while causing the OSD 18 to erase the icon indicative of ongoing recording, as shown in FIG. 10. At this point, a channel number 61 may be displayed to indicate the number of the currently recorded channel, as illustrated in FIG. 10. If the split-screen display is not judged selected, step 24 is reached. In step 24, the system controller 19 causes the post-processor 15 to give a full-screen TV image (recording monitor screen) while causing the OSD 18 to erase the icon indicating ongoing recording. Instead of having the icon erased, the system controller 19 may display an icon 61 indicative of the currently selected channel, as shown in FIG. 14.

Figure 11:
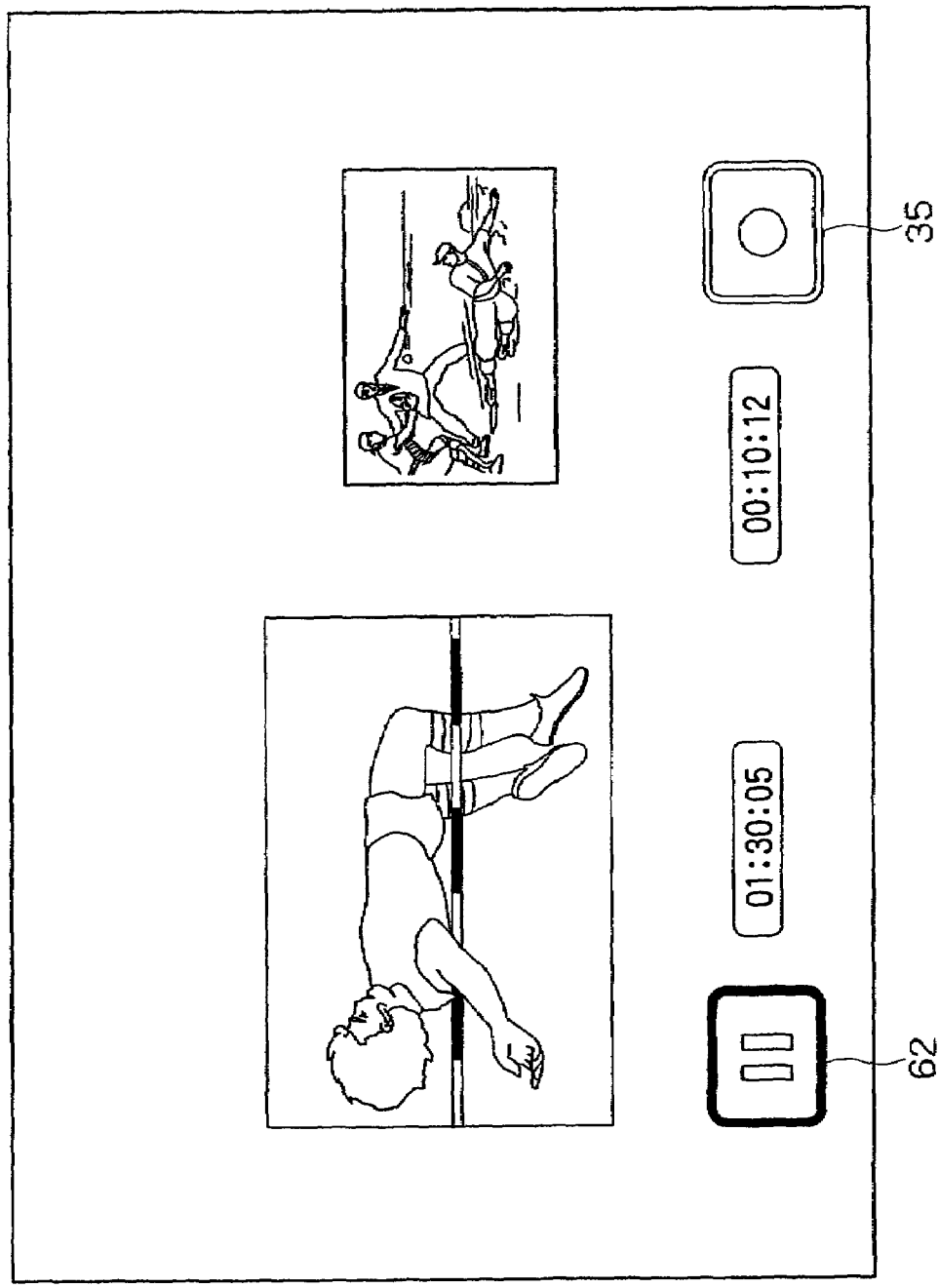
FIG. 11 is a schematic view of another typical display derived from video signals.
Figure 12:
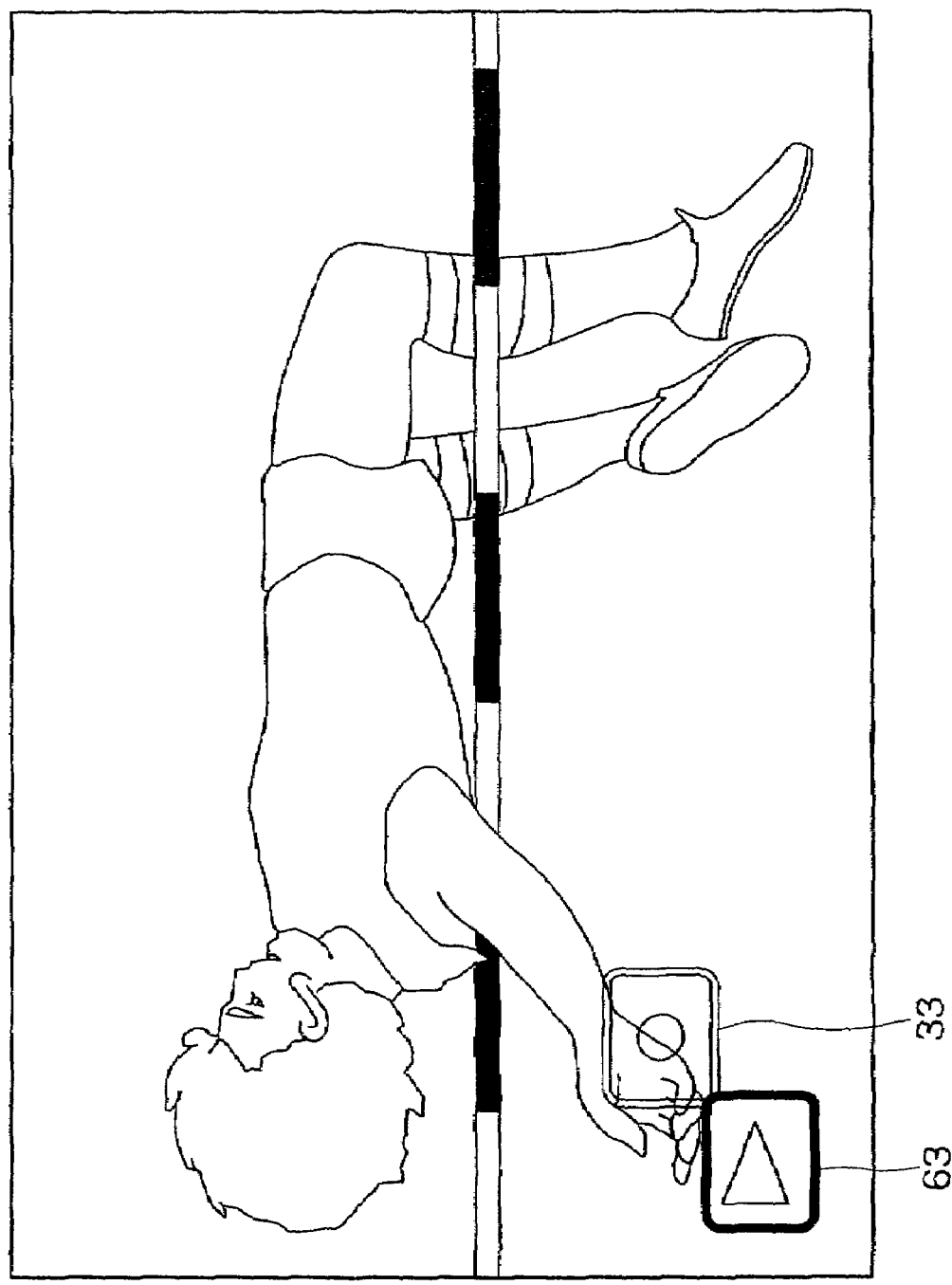
FIG. 12 is a schematic view of another typical display derived from video signals.

If recording is not judged terminated in step 21, the system controller 19 goes to step 25 and checks to see if a stop to playback is designated by the user via the user interface. If playback is stopped by operation of the user, the system controller 19 goes to step 26 and judges whether a split-screen display composed of a recording monitor screen and a playback screen is selected. If the split-screen display is judged selected, step 27 is reached. In step 27, the system controller 19 causes the post-processor 15 to turn the playback screen into a still image and bring about playback pause mode while causing the OSD 18 to substitute a pause-indicating icon 62 for the icon 34 representing ongoing playback on the side of the playback screen, as shown in FIG. 11. If the split-screen display is not judged selected, step 28 is reached. In step 28, the system controller 19 causes the post-processor 15 to turn the playback screen into a still image and bring about playback pause mode while causing the OSD 18 to substitute a pause-indicating icon 63 for the icon 32 representing ongoing playback, as depicted in FIG. 12.

Figure 13:
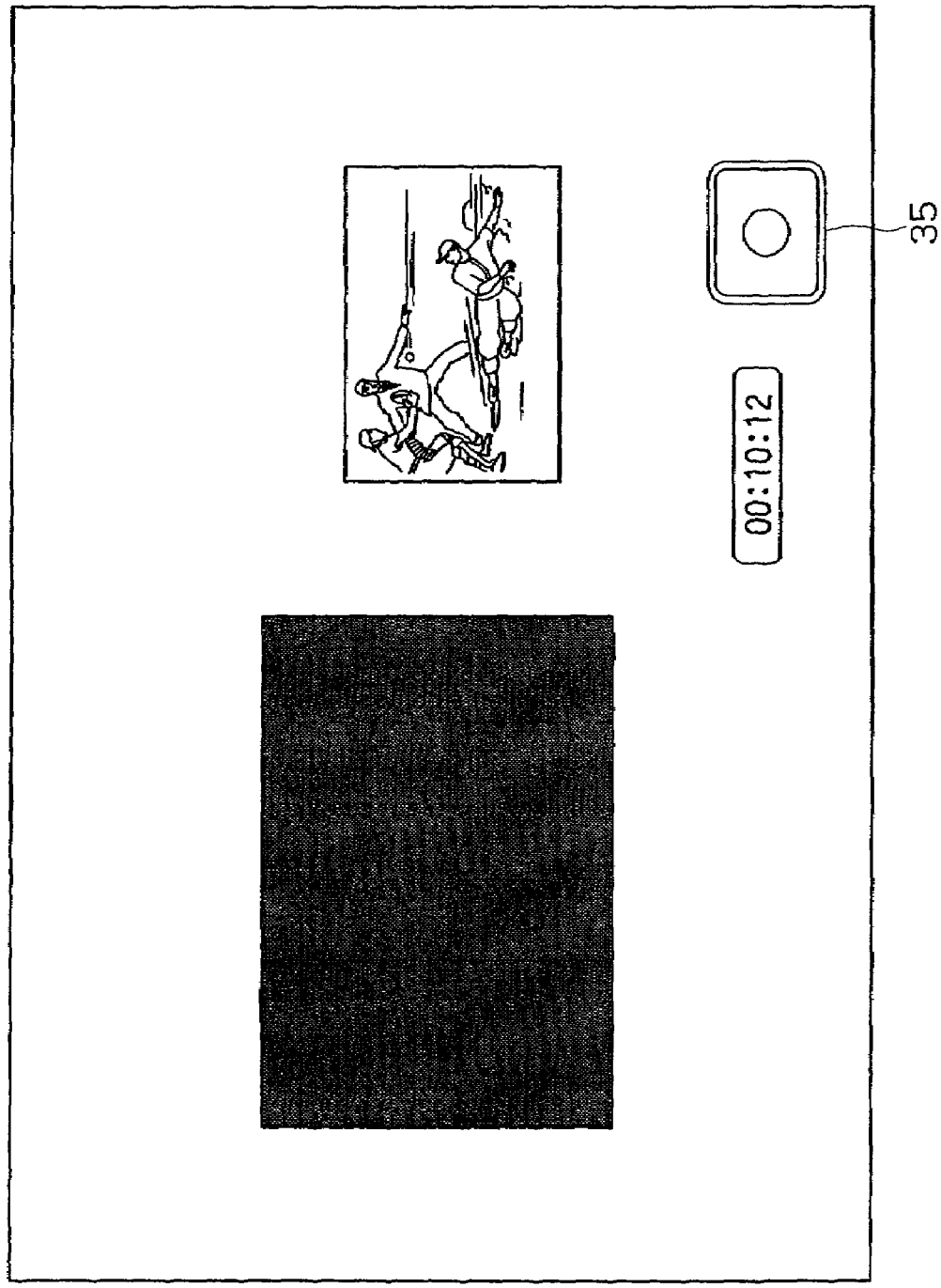
FIG. 13 is a schematic view of another typical display derived from video signals.

If in step 25 playback is not judged stopped by the user, step 29 is reached. In step 29, the system controller 19 judges whether the playback position is catching up with the recording position during follow-up playback. If the recording position is judged overtaken, with the follow-up playback coming to an end, then step 30 is reached. In step 30, a check is made to see if a split-screen display made of a recording monitor screen and a playback screen is selected. If the split-screen display is judged selected, step 31 is reached. In step 31, the system controller 19 causes the post-processor 15 to display the playback screen in black or in blue while causing the OSD 18 to erase the icon 34 indicating ongoing playback, as illustrated in FIG. 13. If the split-screen display is not judged selected, step 32 is reached. In step 32, the system controller 19 causes the post-processor 15 to give a full-screen recording monitor display while displaying the recording-indicating icon replacing the playback icon, as shown in FIG. 3. At this point, the system controller 19 may cause the OSD 18 to give a message saying that a recording monitor screen is now on display or that playback has now caught up with recording.

If in step 29 the playback position is not judged to have caught up with the recording position, with follow-up playback still underway, then step 21 is reached again.

FIG. 15 is a block diagram showing a typical configuration of another video signal recording and reproducing apparatus embodying the invention. A CPU 91 in FIG. 15 controls the overall operation of a computer 150. The CPU 91 is connected to a ROM 92 and a RAM 93 via a bus 94. Programs and fixed data needed by the CPU 91 for control processes are stored in the ROM 92. Various data including working data necessary for processing by the CPU 91 are accommodated in the RAM 93.

The CPU 91 is connected to an input/output interface 95 via the bus 94. Various processing blocks are interconnected via the I/O interface 95.

An input unit 96 is constituted by such input devices as a keyboard and a mouse. The user of the computer 150 enters various commands through the input unit 96.

An output unit 97 and a display unit 98 are made up of speakers and an LCD or a CRT. These components output (display) results of the processing by the CPU 91.

A storage unit 99 is composed of hard discs that store various kinds of information and programs managed by the user of the computer 150.

A communication unit 100 is used to communicate with various terminals via a network 9.

The I/O interface 95 is connected to a drive 101. The drive 101 writes and reads data to and from such storage media as magnetic discs 102 (including floppy discs), optical discs 103 (including CD-ROMs (Compact Disc-Read Only Memory) and DVDs (Digital Versatile Disc)) magneto-optical discs (including MDs (Mini-Disc)), and semiconductor memories 105.

The series of processes and steps described above may be executed either by hardware or by software. For software-based processing to take place, programs constituting the software may be either incorporated beforehand in dedicated hardware or installed upon use from a suitable program storage medium into a general-purpose personal computer or like equipment. For example, the applicant's proprietary software may be installed into the computer 150 and executed thereby to implement the necessary functions.

The software for executing the series of processes or steps described above may be installed upon use into the computer for execution, carried by a suitable program storage medium such as the magnetic disc 102, optical disc 103, magneto-optical disc 104 or semiconductor memory 105 shown in FIG. 15. The programs constituting the software are read from the storage medium by the drive 101 and written to the hard discs in the storage unit 99. The programs placed in the storage unit 99 are loaded into the RAM 90 for execution in accordance with the commands from the CPU 91 responding to the instructions entered by the user through the input unit 96.

As described, the recording and reproducing apparatus according to the invention allows the split-screen display made up of an enlarged recording monitor screen and a smaller playback screen, split-screen display constituted by a smaller recording monitor screen and an enlarged playback screen, and playback screen only, to be switched toggle-style in keeping with the user's operations. The inventive apparatus, prompted by simple operations, thus provides a visual indication of the current recording and playback status.

According to the recording and reproducing apparatus of the invention, a single user operation is sufficient to switch by turns the split-screen display of the enlarged recording monitor screen and smaller playback screen, split-screen display of the smaller recording monitor screen and enlarged playback screen, and playback screen only.

When the split-screen display is in effect, the inventive recording and reproducing apparatus displays an icon indicating the recording monitor screen and another icon representing the playback screen. This feature allows the user to identify the two screens in a simple but distinct manner.

While recording and playback are simultaneously underway, the recording and reproducing apparatus of the invention displays a recording icon and a display icon side by side. This makes it possible for the user easily to recognize the operating status of the apparatus.

When recording ends first during a simultaneous recording-playback process, the inventive recording and reproducing apparatus erases the recording icon or displays a message saying that recording has ended. This feature allows the user to recognize the end of recording while playback is still underway.

When playback is catching up with recording during follow-up playback and playback is thus terminated, the recording and reproducing apparatus according to the invention automatically activates a full-screen recording monitor display. At the same time, the apparatus erases the playback icon or displays a message saying that playback has come to an end. This feature eliminates a sense of awkwardness that may be experienced by the user upon an abrupt transition from one screen display to another.

Furthermore, if playback is stopped by the user's operation during a simultaneous recording-playback process, the inventive recording and reproducing apparatus activates a playback pause screen. This allows the user to visually confirm to what point the playback progressed, thus making it easy for the user later to resume the playback exactly from where it was stopped.

As many apparently different embodiments of this invention may be made without departing from the spirit and scope thereof, it is to be understood that the invention is not limited to the specific embodiments thereof except as defined in the appended claims.

What is claimed is:

1. A recording and reproducing apparatus comprising:
an input element supplied with video signals;
a recording element for recording said video signals input through said input element onto a storage medium;
a reproducing element for reproducing said video signals from said storage medium;
a processing element for generating display-ready video signals on the basis of video monitor image signals supplied by said input element and/or on the basis of the reproduced video signals furnished by said reproducing element; and
a controlling element for selectively activating, by a single operation of a user, any one of a recording monitor image, a dual-screen display image made of a recording monitor image and a playback image, and a playback image alone,
wherein said recording and reproducing to and from the storage medium occurs substantially simultaneously,
wherein, when the dual-screen display image is activated, the controlling element causes the processing element to select one of the recording monitor image and the playback image,
wherein, when the dual-screen display image is activated and the recording monitor image is selected, the controlling element enables only user operations affecting the recording monitor image and disables user operations affecting the playback image, and
wherein, when the dual-screen display image is activated and the playback image is selected, the controlling element enables only user operations affecting the playback image and disables user operations affecting the recording monitor image.

2. A recording and reproducing apparatus according to claim 1, wherein said processing element generates a display screen indicative of a screen monitor image being selected when said dual-screen display image is currently on display.

3. A recording and reproducing apparatus comprising:
an input element supplied with video signals;
a recording element for recording said video signals input through said input element onto a storage medium;
a reproducing element for reproducing said video signals from said storage medium;
a processing element for generating display-ready video signals on the basis of video monitor image signals supplied by said input element and/or on the basis of the reproduced video signals furnished by said reproducing element; and
a controlling element for making operations of a user effective on one of a recording monitor image and a playback image constituting a dual-screen display, wherein said recording and reproducing to and from the storage medium occurs substantially simultaneously, wherein the controlling element causes the processing element to select one of the recording monitor image and the playback image, wherein, when the recording monitor image is selected, the controlling element enables only user operations affecting the recording monitor image and disables user operations affecting the playback image, and wherein, when the playback image is selected, the controlling element enables only user operations affecting the playback image and disables user operations affecting the recording monitor image.

4. A recording and reproducing apparatus according to claim 3, wherein said controlling element causes said processing element to enlarge the currently selected image on display.

5. A recording and reproducing apparatus comprising:
an input element supplied with video signals;
a recording element for recording said video signals input through said input element onto a storage medium;
a reproducing element for reproducing said video signals from said storage medium;
a processing element for generating display-ready video signals on the basis of video monitor image signals supplied by said input element and/or on the basis of the reproduced video signals furnished by said reproducing element; and
a controlling element for selectively activating, by a single operation of a user, any one of a recording monitor image, a dual-screen display image made of a recording monitor image and a playback image, and a playback image alone and said controlling element which, when a follow-up playback is catching up with an on-air recording, then activates a full-screen display of the recording monitor image while giving a sign indicating that said recording monitor image is now activated and on full-screen display, wherein said recording and reproducing to and from the storage medium occurs substantially simultaneously, wherein, when the dual-screen display image is activated, the controlling element causes the processing element to select one of the recording monitor image and the playback image, wherein, when the dual-screen display image is activated and the recording monitor image is selected, the controlling element enables only user operations affecting the recording monitor image and disables user operations affecting the playback image, wherein, when the dual-screen display image is activated and the playback image is selected, the controlling element enables only user operations affecting the playback image and disables user operations affecting the recording monitor image.

6. A recording and reproducing apparatus comprising:
an input element supplied with video signals;
a recording element for recording said video signals input through said input element onto a storage medium;
a reproducing element for reproducing said video signals from said storage medium;
a processing element for generating display-ready video signals constituting a recording monitor image and a playback image in a dual-screen display, on the basis of video monitor image signals supplied by said input element as well as on the basis of the reproduced video signals furnished by said reproducing element; and a controlling element for giving a sign indicative of ongoing recording near said recording monitor image, and another sign indicative of ongoing playback near said playback image, wherein said recording and reproducing to and from the storage medium occurs substantially simultaneously, wherein the controlling element causes the processing element to select one of the recording monitor image and the playback image, wherein, when the recording monitor image is selected, the controlling element enables only user operations affecting the recording monitor image and disables user operations affecting the playback image, wherein, when the playback image is selected, the controlling element enables only user operations affecting the playback image and disables user operations affecting the recording monitor image.

7. A recording and reproducing apparatus according to claim 6, wherein, when recording is stopped, then said sign indicative of ongoing recording is erased.

8. A recording and reproducing apparatus according to claim 6, wherein, when playback is stopped through an operation by a user, then said sign indicative of ongoing playback is replaced by another sign indicative of a pause, with said playback image turned into a still image.

9. A recording and reproducing method comprising the steps of:
recording input video signals onto a storage medium;
reproducing the video signals from said storage medium;
generating display-ready video signals on the basis of video monitor image signals derived from said input video signals and/or on the basis of the reproduced video signals;
selectively activating, by a single operation of a user, any one of a recording monitor image, a dual-screen display image made of a recording monitor image and a playback image, and a playback image alone; and
selecting, when the dual-screen display image is activated, one of the recording monitor image and the playback image, wherein said recording and reproducing to and from the storage medium occurs substantially simultaneously, wherein, when the recording monitor image is selected, enabling only user operations affecting the recording monitor image and disabling user operations affecting the playback image, and wherein, when the playback image is selected, enabling only user operations affecting the playback image and disabling user operations affecting the recording monitor image.

10. A recording and reproducing method comprising the steps of:
recording input video signals onto a storage medium;
reproducing the video signals from said storage medium;
generating display-ready video signals on the basis of video monitor image signals derived from said input video signals and/or on the basis of the reproduced video signals;
making operations of a user effective on one of a recording monitor image and a playback image constituting a dual-screen display; and
selecting one of the recording monitor image and the playback image from the dual-screen display, wherein said recording and reproducing to and from the storage medium occurs substantially simultaneously, wherein, when the recording monitor image is selected, enabling only user operations affecting the recording monitor image and disabling user operations affecting the playback image, and wherein, when the playback image is selected, enabling only user operations affecting the playback image and disabling user operations affecting the recording monitor image.

11. A recording and reproducing method comprising the steps of:

recording input video signals onto a storage medium;

reproducing the video signals from said storage medium;

generating display-ready video signals on the basis of video monitor image signals derived from said input video signals and/or on the basis of the reproduced video signals;

selectively activating, by a single operation of a user, any one of a recording monitor image, a dual-screen display image made of a recording monitor image and a playback image, and a playback image alone;

when a follow-up playback is catching up with an on-air recording, then activating a full-screen display of the recording monitor image while giving a sign indicating that said recording monitor image is now activated and on full-screen display; and selecting one of the recording monitor image and the playback image from the dual-screen display, wherein said recording and reproducing to and from the storage medium occurs substantially simultaneously, wherein, when the recording monitor image is selected, enabling only user operations affecting the recording monitor image and disabling user operations affecting the playback image, and wherein, when the playback image is selected, enabling only user operations affecting the playback image and disabling user operations affecting the recording monitor image.

12. A recording and reproducing method comprising the steps of:

inputting video signals;

recording input video signals onto a storage medium;

reproducing the video signals from said storage medium;

generating display-ready video signals constituting a recording monitor image and a playback image in a dual-screen display, on the basis of video monitor image signals derived from said input video signals as well as on the basis of the reproduced video signals;

selecting one of the recording monitor image and the playback image from the dual-screen display; and giving a sign indicative of ongoing recording near said recording monitor image, and another sign indicative of ongoing playback near said playback image, wherein said recording and reproducing to and from the storage medium occurs substantially simultaneously, wherein, when the recording monitor image is selected, enabling only user operations affecting the recording monitor image and disabling user operations affecting the playback image, and wherein, when the playback image is selected, enabling only user operations affecting the playback image and disabling user operations affecting the recording monitor image.

13. A computer-readable medium storing a computer program for causing a computer to execute the steps of:

recording input video signals onto a storage medium;

reproducing the video signals from said storage medium;

generating display-ready video signals on the basis of video monitor image signals derived from said input video signals and/or on the basis of the reproduced video signals;

selectively activating, by a single operation of a user, any one of a recording monitor image, a dual-screen display image made of a recording monitor image and a playback image, and a playback image alone; and selecting, when the dual-screen display image is activated, one of the recording monitor image and the playback image, wherein said recording and reproducing to and from the storage medium occurs substantially simultaneously, wherein, when the recording monitor image is selected, enabling only user operations affecting the recording monitor image and disabling user operations affecting the playback image, and wherein, when the playback image is selected, enabling only user operations affecting the playback image and disabling user operations affecting the recording monitor image.

14. A computer-readable medium storing a computer program for causing a computer to execute the steps of:

recording input video signals onto a storage medium;

reproducing the video signals from said storage medium;

generating display-ready video signals on the basis of video monitor image signals derived from said input video signals and/or on the basis of the reproduced video signals; and making operations of a user effective on only selected one of a recording monitor image and a playback image constituting a dual-screen display; and selecting one of the recording monitor image and the playback image from the dual-screen display, wherein said recording and reproducing to and from the storage medium occurs substantially simultaneously, wherein, when the recording monitor image is selected, enabling only user operations affecting the recording monitor image and disabling user operations affecting the playback image, and wherein, when the playback image is selected, enabling only user operations affecting the playback image and disabling user operations affecting the recording monitor image.

15. A computer-readable medium storing a computer program for causing a computer to execute the steps of:

recording input video signals onto a storage medium;

reproducing the video signals from said storage medium;

generating display-ready video signals on the basis of video monitor image signals derived from said input video signals and/or on the basis of the reproduced video signals;

selectively activating, by a single operation of a user, any one of a recording monitor image, a dual-screen display image made of a recording monitor image and a playback image, and a playback image alone;

when a follow-up playback is catching up with an on-air recording, then activating a full-screen display of the recording monitor image while giving a sign indicating that said recording monitor image is now activated and on full-screen display; and selecting one of the recording monitor image and the playback image from the dual-screen display, wherein said recording and reproducing to and from the storage medium occurs substantially simultaneously, wherein, when the recording monitor image is selected, enabling only user operations affecting the recording monitor image and disabling user operations affecting the playback image, and wherein, when the playback image is selected, enabling only user operations affecting the playback image and disabling user operations affecting the recording monitor image.

16. A computer-readable medium storing a computer program for causing a computer to execute the steps of:

recording input video signals onto a storage medium;

reproducing the video signals from said storage medium;

generating display-ready video signals constituting a recording monitor image and a playback image in a dual-screen display, on the basis of video monitor image signals derived from said input video signals as well as on the basis of the reproduced video signals; and selecting one of the recording monitor image and the playback image from the dual-screen display; and giving a sign indicative of ongoing recording near said recording monitor image, and another sign indicative of ongoing playback near said playback image, wherein said recording and reproducing to and from the storage medium occurs substantially simultaneously, wherein, when the recording monitor image is selected, enabling only user operations affecting the recording monitor image and disabling user operations affecting the playback image, and wherein, when the playback image is selected, enabling only user operations affecting the playback image and disabling user operations affecting the recording monitor image.

* * * * *